Dec. 3, 1957  H. M. GEYER  2,815,005
FLUID PRESSURE ACTUATOR WITH STROKE END LOCKING MEANS
Filed Dec. 12, 1955  2 Sheets-Sheet 1
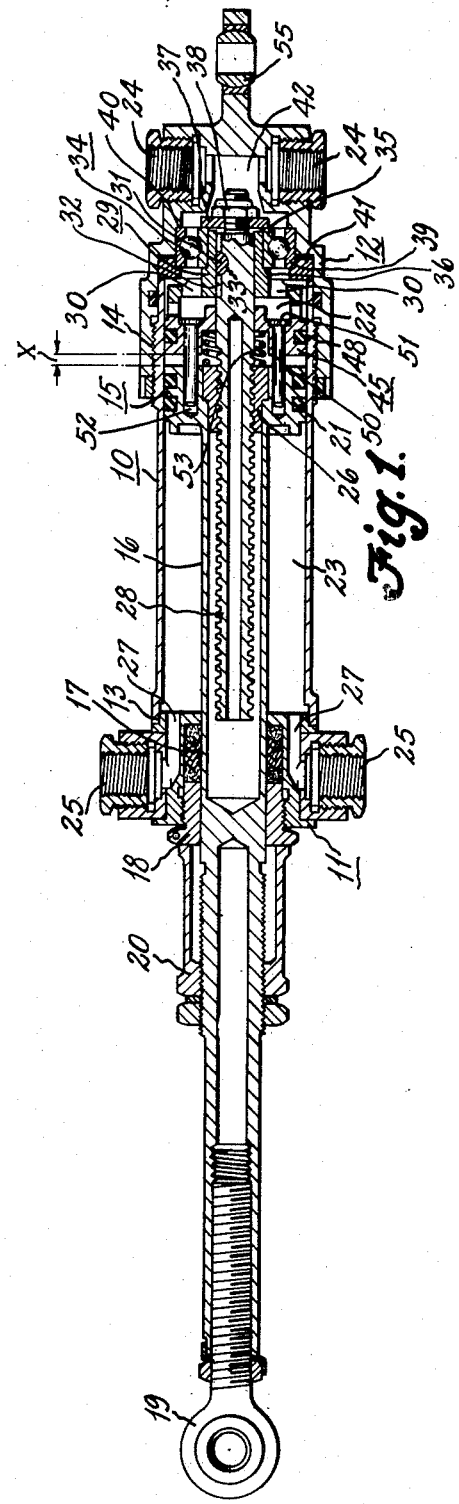
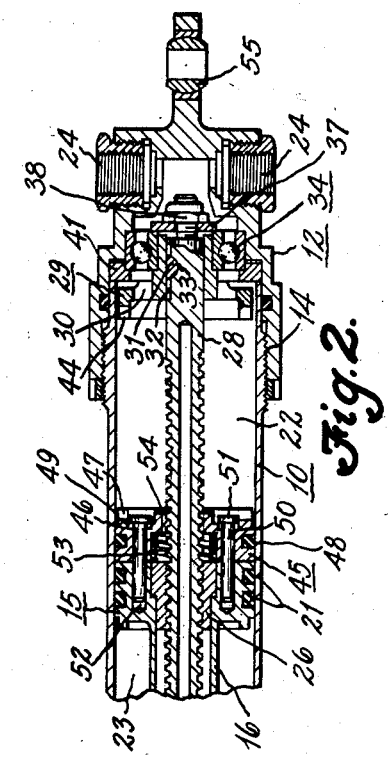
INVENTOR.
HOWARD M. GEYER
BY
Craig V. Morton
ATTORNEY Dec. 3, 1957          H. M. GEYER          2,815,005
FLUID PRESSURE ACTUATOR WITH STROKE END LOCKING MEANS
Filed Dec. 12, 1955          2 Sheets-Sheet 2
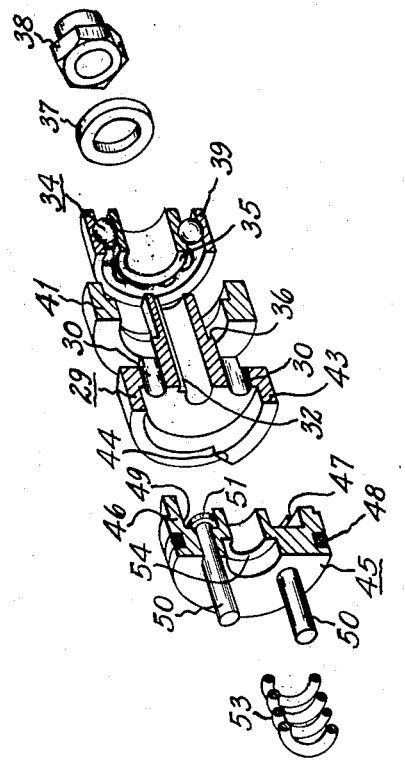
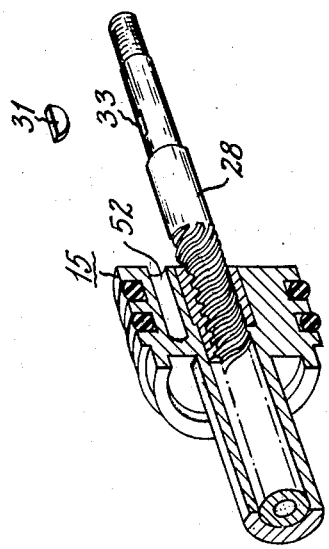
Fig. 3.
INVENTOR.
HOWARD M. GEYER
BY
Craig V. Morton
ATTORNEY United States Patent Office 2,815,005
Patented Dec. 3, 1957

2,815,005

FLUID PRESSURE ACTUATOR WITH STROKE END LOCKING MEANS

Howard M. Geyer, Dayton, Ohio, assignor to General Motors Corporation, Detroit, Mich., a corporation of Delaware Application December 12, 1955, Serial No. 552,550

12 Claims. (Cl. 121—40)

This invention pertains to fluid pressure actuators, and particularly to a fluid pressure operated linear actuator including stroke end locking means.

In some actuator installations it is only necessary to lock the actuator against movement in one position, for instance, at one end of the stroke. The present invention relates to a linear actuator including a cylinder, a piston reciprocable therein, and a screw shaft rotatably journaled in the cylinder and operatively connected to the piston whereby piston reciprocation effects and is dependent upon rotation of the screw shaft. The actuator also includes releasable means to lock the screw shaft and, hence, the piston against movement at one stroke end of the piston. Accordingly, among my objects are the provision of a fluid pressure operated actuator including releasable stroke end locking means; the further provision of a fluid pressure operated actuator including stroke end locking means and means for automatically releasing the locking means upon application of pressure fluid to the actuator so as to effect actuator movement away from the stroke end locking position; the further provision of stroke end locking means for a linear actuator; and the still further provision of an actuator assembly including stroke end locking means.

The aforementioned and other objects are accomplished in the present invention by connecting one locking element to the actuator screw shaft and connecting a second locking element to the actuator piston through lost motion means. Specifically, the actuator comprises a cylinder having a reciprocable piston disposed therein capable of fluid pressure actuation in both directions. One end of the cylinder is adapted for attachment to a fixed support, and the piston includes a rod which extends through the other end wall of the cylinder and is adapted for connection to a nonrotatable load device. Accordingly, both the cylinder and piston are restrained against rotation while the piston is free to reciprocate relative to the cylinder. A rotatable member, a screw shaft, is bearing supported in the cylinder, and the piston has attached thereto a nonrotatable nut which engages the screw shaft, the threads on the nut and screw shaft being non-self-locking. Accordingly, piston movement is dependent upon and effects rotation of the screw shaft. Hence, it is readily apparent that if the screw shaft is restrained against rotation, the piston will be locked against movement.

The stroke end locking means comprise a first locking element attached to the screw shaft and a second locking element operatively connected to the piston, the operative connection including lost motion means permitting limited relative linear movement therebetween. The first locking element comprises an annulus keyed to the screw shaft having a flange with a saw-toothed face. The second locking element comprises an annulus having a flange with a complementary saw-toothed face, the second locking element being operatively connected to the piston by a plurality of headed dowel pins which prevent relative rotation therebetween. The dowel pins are fixedly attached to the head end of the piston and slidably received in apertures of the second locking annulus, this connection constituting the lost motion means which permit relative linear movement therebetween. In addition, a spring is interposed between the piston head and the second locking annulus for urging the second locking annulus away from the piston head. The spring and dowel pin arrangement permits relative reciprocation between the second locking element and the piston to facilitate engagement and disengagement of the teeth of the two locking elements.

The locking elements are engageable only at the fully retracted position, or stroke end, of the actuator piston. Thus, when the locking elements are engaged with the actuator piston fully retracted, the load attached to the piston cannot extend the actuator. The actuator piston divides the cylinder into extend and retract chambers. The locking means are automatically released upon application of pressure fluid to the extend actuator chamber since the locking element operatively connected to the piston has a surface which sealingly engages the cylinder walls whereby when pressure fluid is admitted to the extend chamber, the piston carried locking element moves towards the piston head to disengage the locking elements.

Further objects and advantages of the present invention will be apparent from the following description, reference being had to the accompanying drawings wherein a preferred embodiment of the present invention is clearly shown.

In the drawings:

Fig. 1 is a longitudinal view, partly in section and partly in elevation, of an actuator constructed according to this invention with the stroke end locking means engaged.

Fig. 2 is a fragmentary view similar to Fig. 1 with the stroke end locking means released, or disengaged.

Fig. 3 is an exploded view, partly in section and partly in elevation, of the stroke end locking means.

With particular reference to Figs. 1 and 2 of the drawings, an actuator is shown including a cylinder 10 to which end cap members 11 and 12 are suitably secured, such as by means of a press-fit, as indicated by numeral 13 on the tail cap 11, and a screw threaded coupling, indicated by numeral 14 on the head cap 12. A piston 15 is disposed within the cylinder 10 for reciprocable movement under the urge of fluid under pressure. The piston 15 includes an axially extending hollow rod portion 16, which extends through a central aperture in the tail cap 11, suitable sealing means 17 engaging the outer periphery of the rod 16. The rod 16 also extends through an abutment member 18 having screw threaded engagement with the tail cap 11, the free end of the rod 16 having attached thereto an eye-bolt 19, which is adapted for connection to any suitable load device, not shown, which prevents rotation of the piston 15. The piston rod 16 also has attached thereto an abutment member 20, which is engageable with the cylinder carried abutment member 18, thereby limiting movement of the piston 15 to the left as viewed in Fig. 1, and defining the retract stroke end position of the piston.

The piston 15 carries suitable sealing means 21, which engage the inner periphery of the cylinder 10 whereby the piston 15 divides the cylinder 10 into an extend chamber 22 and a retract chamber 23. The extend chamber 22 connects through passage means, hereinafter described, with extend port fittings 24 carried by the head cap member 12. The retract chamber 23, likewise, connects with retract port fittings 25 carried by the tail cap member 11, the fittings 25 communicating with the retract chamber through passages 27 in the tail cap 11. It is to be understood that the extend and retract post fittings 24 and 25 are connected by suitable conduit means, not shown, in an actuator installation with a valve so that pressure fluid may be admitted from a pressure source, not shown, to either the extend chamber 22 or the retract chamber 23 while the chamber to which pressure fluid is not admitted is connected to drain. Accordingly, it will be appreciated that the piston 15 is capable of fluid pressure actuation in both directions.

The piston 15 has a central recess within which a nonrotatable nut 26 is fixedly secured. The nut 25 threadedly engages a screw shaft 28, which extends into the hollow piston rod 16, the threads on both the nut and the screw shaft 28 being non-self-locking. The screw shaft, or rotatable member, 28 has connected thereto an annulus 29 having a pair of openings 30 therethrough. The annulus 29 is connected to rotate with the screw shaft by means of a key 31, which is received in an axially extending slot 32 in the annulus, as well as being received in a notch 33 in the screw shaft 28. The annulus 29 and the screw shaft 28 are rotatably journaled in the head cap 12 of the cylinder by ball bearing assembly 34, which is of the combined radial and thrust type. The inner race 35 of the ball bearing assembly 34 is held between a shoulder 36 on the annulus and a plate member 37 affixed to the screw shaft by a nut 38. The outer race 39 of the ball bearing assembly is retained in position between a shoulder 40 on the head cap 12 and a ring 41 confined between the cylinder 10 and the head cap 12. The passage means between the extend chamber 22 and the extend port fittings 24 comprise the holes 30 in the annulus 29, the spaces between the balls in the ball bearing assembly 34 and the internal recess 42 of the head cap 12.

With particular reference to Figs. 1 through 3, the stroke and locking means will be described in detail. As seen particularly in Fig. 3, the annulus 29, which comprises one locking element, has a flange 43 with a saw-toothed face, as depicted by numeral 44. Moreover, the locking element 29 is restrained against axial movement relative to the cylinder by the ball bearing assembly 34 while being connected to rotate with the screw shaft 28 by the key 31. The second locking element of the locking means comprises an annulus 45 having a flange 46 with a complementary saw-toothed face 47. The annulus 45 carries a sealing ring 48, which engages the inner periphery of the cylinder 10. In addition, the annulus 45 is formed with a plurality of openings 49 through which a plurality of dowel pins 50 slidably extend. The dowel pins 50 have heads 51 arranged to abut the annulus 45 and limit movement of the annulus 45 away from the head of the piston 15. The inner ends of the dowel pins 50 are fixedly secured within recesses 52 in the piston. The annulus 45 is normally urged away from the head of the piston 15 by a compression spring 53, opposite ends of which engage the head of the piston 15 and a shoulder 54 of the annulus 45. By reason of the dowel pins 50 being slidably received in the openings 49 of the annulus 45, the annulus 45, while restrained against rotation relative to the piston 15, is free to move throughout a limited distance axially relative to the piston. Thus, the annulus 45 may be said to be connected to the piston through lost motion means, the limited relative axial movement between the piston and the annulus 45 being indicated by letter X in Fig. 1.

The second locking element, or annulus, 45 has a lost motion connection with the piston 15 to facilitate both engagement and disengagement of the complementary saw-toothed flanges on the two locking elements. The stroke end locking means are shown in the engaged position in Fig. 1, and in a released, or disengaged, position in Fig. 2. Moreover, when the locking means are engaged, as depicted in Fig. 1, the annulus 45 is farthest away from the head of the piston 15, and when the locking means are disengaged, as disclosed in Fig. 2, during pressure application to the extend chamber 22, the annulus 45 abuts the head of the piston 15.

The head cap 12 of the cylinder 10 also carries an attaching fixture 55 by which means the cylinder may be connected to a fixed support, not shown, which prevents rotation of the cylinder. Moreover, the stroke end locking means are automatically released upon application of pressure fluid to the extend chamber 22, since the pressure fluid will act on the right-hand surface of the annulus 45, as viewed in the drawings so as to move the annulus 45 to the left, as viewed in Fig. 1, to disengage the teeth on the annulus 45 from the teeth on the annulus 29. Thereafter, the actuator piston 15 may be moved to the left, as viewed in Fig. 1, to any desired position. The extend stroke limit of the piston 15 is determined by engagement of the rod end surface of the piston 15 with the right-hand end surface of the tail cap 11.

*Operation*

As stated hereinbefore, the locking means of the actuator disclosed herein are only operable to prevent movement of the piston by restraining rotation of the screw shaft at one stroke end position of the actuator piston, namely, the retract stroke end. In all other positions of the actuator piston within the cylinder, the locking means are ineffective, since the locking element 45 moves with the piston 15 and can only engage the locking element 29 when the actuator is fully retracted. Upon application of pressure fluid to the retract chamber 23 through the fittings 25, the piston 15 may be moved to the position depicted in Fig. 1, it being understood that when pressure is applied to the retract chamber 23, the extend chamber 22 is connected to drain. When the actuator piston 15 reaches its fully retracted position wherein the abutment 20 engages the abutment 18, the saw-toothed face 47 of the locking element 45 will be disposed in contiguous relation to the saw-toothed face 44 of the locking element 29. Accordingly, if the pressure in the retract chamber 23 is relieved, movement of the actuator piston 15 to the left, or to an extended position, will be precluded since the screw shaft 28 is restrained against rotation due to being coupled through the locking elements 29 and 45 to the nonrotatable piston 15. To release the locking means and extend the actuator piston 15, it is only necessary to apply pressure fluid through the extend port fittings 24 to the extend chamber 22 while the retract chamber 23 is connected to drain. When this is done, the locking element 45 will move to the left, as viewed in Fig. 1, relative to the piston 15, thereby disengaging the complementary saw-toothed faces of the locking elements 45 and 29 so as to free the screw shaft 28 for rotation. Since the screw shaft 28 is free to rotate when the locking means are released, the piston 15 can be extended by being moved to the left, as viewed in Fig. 1, by pressure fluid in the extend chamber 22.

From the foregoing, it is readily apparent that the present invention provides unique stroke end locking means for an actuator, which locking means are automatically released upon application of pressure fluid to extend the actuator. Moreover, the locking means are positive in operation since when the saw-toothed faces of the locking elements are in engagement, rotation of the screw shaft, and, hence, movement of the piston are precluded.

While the embodiment of the present invention as herein disclosed, constitutes a preferred form, it is to be understood that other forms might be adopted.

What is claimed is as follows:

1. A fluid pressure operated actuator including, a cylinder, a reciprocable piston disposed in the cylinder capable of fluid pressure actuation in both directions, a member rotatably journaled in said cylinder and operatively connected to said piston such that piston reciprocation effects and is dependent upon rotation of said member, and releasable locking means carried by the piston and engageable with said rotatable member at only one stroke end of the piston for preventing rotation of said member and thereby locking the piston against movement.

2. A fluid pressure operated actuator including, a cylinder, a reciprocable piston disposed in the cylinder capable of fluid pressure actuation in both directions, a member rotatably journaled in said cylinder and operatively connected to said piston such that piston reciprocation effects and is dependent upon rotation of said member, locking means carried by the piston and engageable with said rotatable member at only one stroke end of the piston for restraining rotation of said member to lock the piston against movement, and means to release said locking means.

3. A fluid pressure operated actuator including, a cylinder, a reciprocable piston disposed in the cylinder capable of fluid pressure actuation in both directions, a member rotatably journaled in said cylinder and operatively connected to said piston such that piston reciprocation effects and is dependent upon rotation of said member, locking means carried by the piston and engageable with said rotatable member at only one stroke end of the piston for preventing rotation of said member to lock the piston against movement, and means automatically operable upon application of pressure fluid to the actuator cylinder so as to effect movement of the piston away from said one stroke end for releasing said locking means to permit rotation of said member and movement of said piston.

4. A fluid pressure operated actuator including, a cylinder, a reciprocable piston in said cylinder, said piston dividing said cylinder into an extend chamber and a retract chamber, a member rotatably journaled in said cylinder and operatively connected to said piston such that piston reciprocation effects and is dependent upon rotation of said member, and releasable locking means carried by the piston and engageable with said rotatable member at only one stroke end of the piston for restraining rotation of said member to lock the piston against movement.

5. A fluid pressure operated actuator including, a cylinder, a reciprocable piston in said cylinder, said piston dividing said cylinder into an extend chamber and a retract chamber, a member rotatably journaled in said cylinder and operatively connected to said piston such that piston reciprocation effects and is dependent upon rotation of said member, locking means carried by the piston and engageable with said rotatable member at only one stroke end of the piston for preventing rotation of said member to lock the piston against movement, and means automatically operable to release said locking means and permit rotation of said member and movement of said piston upon application of pressure fluid to the extend chamber.

6. An actuator assembly including, a cylinder, a piston reciprocable therein, a member rotatably supported in said cylinder and operatively connected to said piston such that piston reciprocation effects and is dependent upon rotation of said member, and releasable locking means carried by the piston and engageable with said member at only one stroke end of the piston for restraining rotation of said member, and, consequently, preventing movement of said piston at said one stroke end when the actuator is inactive.

7. An actuator assembly including, a cylinder, a piston reciprocable therein, a member rotatably supported in said cylinder and operatively connected to said piston such that piston reciprocation effects and is dependent upon rotation of said member, locking means carried by the piston and engageable with said member at only one stroke end of the piston for preventing rotation of the member, and, consequently, locking said piston at said one stroke end when the actuator is inactive, and means to release said locking means to permit piston movement away from said one stroke end.

8. Stroke end locking means for an actuator having a cylinder, a piston reciprocable therein and a member rotatably journaled in said cylinder and operatively connected to said piston whereby piston reciprocation effects and is dependent upon rotation of said member, including, a first locking element disposed within the cylinder adjacent one end thereof and connected to said member for rotation therewith, and a second non-rotatable locking element operatively connected to said piston and movable into engagement with said first locking element adjacent only one stroke end of the piston for locking the member against rotation and preventing movement of the piston.

9. Stroke end locking means for an actuator having a cylinder, a piston reciprocable therein and a member rotatably journaled in said cylinder and operatively connected to said piston whereby piston reciprocation effects and is dependent upon rotation of said member, including, a first locking element disposed within the cylinder adjacent one end thereof and connected to said member for rotation therewith, and a second non-rotatable locking element operatively connected to said piston and movable into engagement with said first locking element adjacent only one stroke end of the piston for locking the member against rotation and preventing movement of the piston, the operative connection between said second locking element and said piston including lost motion means whereby said second locking element may be disengaged from said first locking element to free said member for rotation and said piston for reciprocation.

10. A device of the character set forth in claim 9 wherein said lost motion means comprises a plurality of headed dowel pins which are fixedly secured to the piston and slidably received in openings in said second locking element.

11. Stroke end locking means for an actuator having a cylinder, a piston reciprocable therein and a member rotatably journaled in said cylinder and operatively connected to said piston whereby piston reciprocation effects and is dependent upon rotation of said member, including, a first locking element disposed within the cylinder adjacent one end thereof and connected to said member for rotation therewith comprising an annulus having a flange with a saw-toothed face, and a second non-rotatable locking element operatively connected to said piston comprising an annulus having a flange with a complementary saw-toothed face, said second locking element being movable into engagement with said first locking element adjacent one stroke end of the piston for locking the member against rotation and preventing movement of said piston.

12. Stroke end locking means for an actuator having a cylinder, a piston reciprocable therein and a member rotatably journaled in said cylinder and operatively connected to said piston whereby piston reciprocation effects and is dependent upon rotation of said member, including a first locking element disposed within the cylinder adjacent one end thereof and connected to said member for rotation therewith comprising an annulus having a flange with a saw-toothed face, and a second nonrotatable locking element operatively connected to said piston comprising an annulus having a flange with a complementary saw-toothed face, said second locking element being movable into engagement with said first locking element adjacent one stroke end of the piston for locking the member against rotation and preventing movement of said piston, the operative connection between the second locking element and the piston comprising a plurality of headed dowel pins which are fixedly secured to the piston and slidably received in openings in said second locking element so as to permit relative linear movement between said second locking element and said piston whereby the second locking element may be disengaged from the first locking element to free the member for rotation and the piston for reciprocation.

References Cited in the file of this patent

UNITED STATES PATENTS

| 1,643,563 | Nell | Sept. 27, 1927 |
| 1,842,776 | Bogoslowsky | Jan. 26, 1932 |
| 2,643,642 | Geyer | June 30, 1953 |

FOREIGN PATENTS

| 608,704 | Great Britain | Sept. 20, 1948 |